(12) United States Patent
Bono, Jr.

(10) Patent No.: US 12,449,135 B2
(45) Date of Patent: Oct. 21, 2025

(54) GASKET WITH EMBEDDED WIRE FRAME SECURED TO A MOUNTING CLIP

(71) Applicant: Davlyn Manufacturing Company, Inc., Spring City, PA (US)

(72) Inventor: James J. Bono, Jr., Spring City, PA (US)

(73) Assignee: DAVLYN MANUFACTURING COMPANY, INC., Spring City, PA (US)

( * ) Notice: Subject to any disclaimer, the term of this patent is extended or adjusted under 35 U.S.C. 154(b) by 788 days.

(21) Appl. No.: 17/733,198

(22) Filed: Apr. 29, 2022

(65) Prior Publication Data
US 2022/0349585 A1  Nov. 3, 2022

Related U.S. Application Data

(60) Provisional application No. 63/181,634, filed on Apr. 29, 2021.

(51) Int. Cl.
*F24C 15/02* (2006.01)
(52) U.S. Cl.
CPC .................. *F24C 15/021* (2013.01)
(58) Field of Classification Search
None
See application file for complete search history.

(56) References Cited

U.S. PATENT DOCUMENTS

| 505,084 A | 9/1893 | Barnes |
| 505,703 A | 9/1893 | Dodge |
| 623,982 A | 5/1899 | Chesterton |
| 747,448 A | 12/1903 | Lomasney |

(Continued)

FOREIGN PATENT DOCUMENTS

| DE | 2106774 A1 | 8/1972 |
| DE | 10350197 A1 | 8/2005 |

(Continued)

OTHER PUBLICATIONS

Extended European Search Report issued Sep. 15, 2022 in EP Application No. 22170764.9-1016.

(Continued)

*Primary Examiner* — Jorge A Pereiro
(74) *Attorney, Agent, or Firm* — Panitch Schwarze Belisario & Nadel LLP (57) ABSTRACT

A gasket is for attachment to a mounting base comprising either an oven door or an oven-door strike surface for abutting a closed oven door. The mounting base has mounting receptacles to secure the gasket, which has a tubular gasket body with a gasket core and a jacket disposed radially outwardly from and surrounding the gasket core, which surrounds a body interior. A frame within the body interior extends along the body interior and defines a shape alignable with a mounting configuration. The frame is elongated movable within the body interior to allow limited movement of the gasket body with respect to the shape by allowing movement of the frame within the body interior. Spring clips extend radially outwardly from the gasket body and are located and configured to engage the mounting receptacles to secure the gasket to the mounting base.

20 Claims, 4 Drawing Sheets

(56) References Cited

U.S. PATENT DOCUMENTS

| | | |
|---|---|---|
| 749,969 A | 1/1904 | Munson |
| 767,763 A | 8/1904 | Reinvaldt |
| 866,696 A | 9/1907 | Taylor |
| 2,060,353 A * | 11/1936 | Tea .................. B60J 10/15 49/500.1 |
| 2,102,392 A * | 12/1937 | Tea .................. B60J 10/15 28/279 |
| 2,121,854 A * | 6/1938 | Breer ................ B60J 10/80 428/397 |
| 2,121,893 A * | 6/1938 | Tea .................. B60J 10/15 428/375 |
| 2,601,512 A * | 6/1952 | Gagnier ............. B60J 10/30 49/492.1 |
| 2,607,965 A * | 8/1952 | Gagnier ............. B60R 13/06 49/492.1 |
| 2,612,665 A * | 10/1952 | Scott ................ B60J 10/36 49/492.1 |
| 2,665,458 A | 1/1954 | Wilcox |
| 2,938,249 A * | 5/1960 | Milne ................ B60J 10/30 49/492.1 |
| 3,167,824 A * | 2/1965 | Berwanger .......... B60J 10/30 49/492.1 |
| 3,167,826 A * | 2/1965 | Watzl ................ B60J 10/80 49/492.1 |
| 3,320,106 A | 5/1967 | Kirkpatrick |
| 3,543,353 A | 12/1970 | Meehan |
| 3,578,764 A | 5/1971 | Nunnally et al. |
| 3,781,021 A | 12/1973 | Thomson et al. |
| 3,812,316 A | 5/1974 | Milburn |
| 3,857,139 A | 12/1974 | Turner |
| 4,156,533 A | 5/1979 | Close et al. |
| 4,223,660 A | 9/1980 | Lang |
| 4,371,180 A | 2/1983 | Case et al. |
| 4,484,378 A | 11/1984 | Kimura et al. |
| 4,538,381 A | 9/1985 | Vogel |
| 4,822,060 A | 4/1989 | Moyer et al. |
| 4,931,326 A | 6/1990 | Weil |
| 4,979,280 A | 12/1990 | Weil |
| 4,986,033 A | 1/1991 | Weil |
| 5,066,028 A | 11/1991 | Weil |
| 5,082,297 A | 1/1992 | Flasher |
| 5,107,623 A | 4/1992 | Weil |
| 5,197,807 A | 3/1993 | Kuznar |
| 5,205,075 A | 4/1993 | Moyer |
| 5,289,658 A | 3/1994 | Lusen et al. |
| 5,341,601 A | 8/1994 | Moyer |
| 5,377,999 A | 1/1995 | Gorman |
| 5,395,126 A | 3/1995 | Tresslar |
| 5,614,282 A | 3/1997 | Bono, Jr. et al. |
| 5,617,900 A | 4/1997 | Weil |
| 5,806,149 A | 9/1998 | Schultz et al. |
| 5,866,216 A | 2/1999 | Flasher |
| 5,918,885 A | 7/1999 | Radke, II |
| 6,533,289 B2 | 3/2003 | Bono, Jr. et al. |
| 6,893,025 B2 | 5/2005 | Hight, Jr. et al. |
| 7,007,955 B2 | 3/2006 | Cross et al. |
| 7,025,359 B2 | 4/2006 | Flasher |
| 7,093,838 B2 | 8/2006 | Hight, Jr. et al. |
| 7,104,546 B2 | 9/2006 | Bono, Jr. |
| 7,124,540 B2 | 10/2006 | Qiang |
| 7,464,461 B2 | 12/2008 | Hight, Jr. et al. |
| 7,735,836 B2 | 6/2010 | Bono, Jr. |
| 8,100,604 B1 | 1/2012 | Flasher |
| 9,086,149 B2 | 7/2015 | Qiang et al. |
| 9,447,628 B2 | 9/2016 | Qiang et al. |
| 2003/0001344 A1 | 1/2003 | Bono, Jr. et al. |
| 2003/0213181 A1 | 11/2003 | Weil |
| 2004/0026874 A1 | 2/2004 | Flasher |
| 2004/0070155 A1 | 4/2004 | Bono |
| 2007/0018412 A1 | 1/2007 | Bono |
| 2010/0175680 A1 | 7/2010 | Han |
| 2013/0097937 A1 | 4/2013 | Flasher |

FOREIGN PATENT DOCUMENTS

| | | |
|---|---|---|
| FR | 2817949 A1 | 6/2002 |
| FR | 2842263 A1 | 1/2004 |

OTHER PUBLICATIONS

Office Action issued Nov. 12, 2024 in EP Application No. 22 170 764.9-1005.

* cited by examiner

GASKET WITH EMBEDDED WIRE FRAME SECURED TO A MOUNTING CLIP

CROSS-REFERENCE TO RELATED APPLICATIONS

This application claims the benefit of priority under 35 USC § 119(e) of U.S. Provisional Patent Application No. 63/181,634 filed Apr. 29, 2021; and the contents of the application(s) identified in this paragraph are incorporated into the present application by reference in their entirety.

BACKGROUND OF THE DISCLOSURE

The present disclosure relates generally to a system or device for securing a gasket to a surface or a body, and more particularly relates to a system or device for securing a gasket to a door of an oven, including the oven portion of a range, or to the body of an oven or other object so as to be disposed between a moving part thereof, such as a door, and a stationary part thereof. The present disclosure relates more particularly to a gasket with an embedded wire frame and an embedded mounting clip.

BRIEF SUMMARY OF THE DISCLOSURE

Briefly stated, one aspect of the present disclosure is directed to a gasket for attachment to a mounting base comprising either an oven door or an oven-door strike surface for abutting a closed oven door, the mounting base having a plurality of mounting receptacles disposed to secure the gasket to the mounting surface in a mounting configuration. The gasket may comprise a gasket body, the gasket body being tubular and elongated and having a gasket core. A jacket may be disposed radially outwardly from and may surround the gasket core. The gasket core may be elongated and may surround a body interior. The body interior may be elongated and hollow. A frame may be disposed within the body interior and may extend along the body interior. The frame may define a shape alignable with the mounting configuration. The frame may be elongated and movable within the body interior to allow limited movement of the gasket body with respect to the shape by allowing movement of the frame within the body interior. A plurality of spring clips may be attached to the gasket body. The plurality of spring clips may extend radially outwardly from the gasket body and may be located and configured to engage the plurality of mounting receptacles of the mounting surface in the mounting configuration.

Briefly stated, another aspect of the present disclosure is directed to a method for attaching a gasket to a mounting base comprising either an oven door or an oven-door strike surface for abutting a closed oven door, the mounting base having a plurality of mounting receptacles disposed to secure the gasket to the mounting surface in a mounting configuration. The method may comprise aligning the gasket with the mounting configuration. The gasket may comprise a gasket body, the gasket body being tubular and elongated and having a gasket core. A jacket may be disposed radially outwardly from and may surround the gasket core. The gasket core may be elongated and may surround a body interior. The body interior may be elongated and hollow. A frame may be disposed within the body interior and may extend along the body interior. The frame may define a shape alignable with the mounting configuration. The frame may be elongated and movable within the body interior to allow limited movement of the gasket body with respect to the shape by allowing movement of the frame within the body interior. A plurality of spring clips may be attached to the gasket body. The plurality of spring clips may extend radially outwardly from the gasket body and may be located and configured to engage the plurality of mounting receptacles of the mounting surface in the mounting configuration. The method may comprise engaging the plurality of spring clips with the plurality of mounting receptacles in the mounting configuration, and such engaging may comprise moving the gasket body relative to the frame to position at least one spring clip of the plurality of spring clips for engagement with at least one mounting receptable of the plurality of mounting receptacles.

BRIEF DESCRIPTION OF THE DRAWINGS

The following detailed description will be better understood when read in conjunction with the appended drawings. For the purpose of illustrating the invention, there are shown in the drawings various embodiments, including embodiments which may be presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of the gasket and designated parts thereof. Unless specifically set forth herein, the terms "a," "an," and "the" are not limited to one element but instead should be read as meaning "at least one." "At least one" may occasionally be used for clarity or readability, but such use does not change the interpretation of "a," "an," and "the." Moreover, the singular includes the plural, and vice versa, unless the context clearly indicates otherwise. As used herein, the terms "proximal" and "distal" are relative terms referring to locations or elements that are closer to (proximal) or farther from (distal) with respect to other elements, the user, or designated locations. "Including" as used herein means "including but not limited to." The word "or" is inclusive, so that "A or B" encompasses A and B together, A only, and B only. The terms "about," "approximately," "generally," "substantially," and like terms used herein, when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit thereof. The terminology includes the words noted above, derivatives thereof, and words of similar import.

In one aspect, referring to FIGS. 1-6, a gasket 10 is disclosed for attachment to an oven door 110 of an oven 100, which may be the oven portion of a range. The oven door 110 has an interior surface 112, facing toward and configured to cover an opening 104 for accessing an interior of the oven 100. The interior surface 112 of the oven door 100 may include a plurality of mounting receptacles such as mounting holes 114, which may function as described below. In an alternative installation, the gasket 10 may be attached to an oven-door strike surface 102 of the oven 100, and the oven-door strike surface 102 (the surface abutting the oven door 110 when the oven door 100 is closed) may include mounting receptacles (not shown) disposed as on the oven door 110. The gasket 10 may be attached to a mounting surface, which may include the oven door 110, the oven-door strike surface 102, or any surface which may require a gasket of the general type of the gasket 10, in a mounted configuration.

Figure 1:
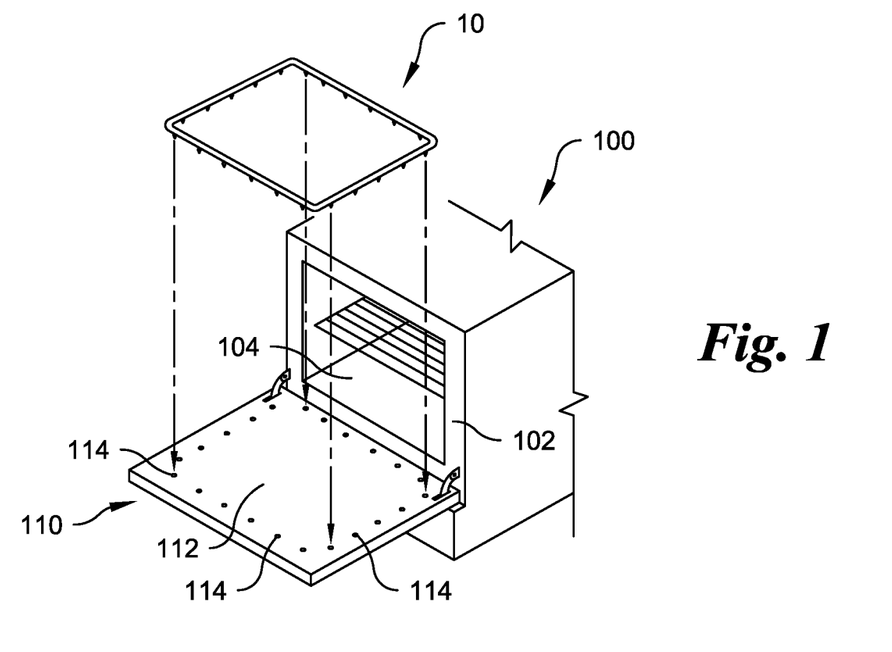
FIG. 1 is a front perspective, partially exploded view of an oven and a gasket according to a first preferred embodiment of the present disclosure in a neutral state.
Figure 2:
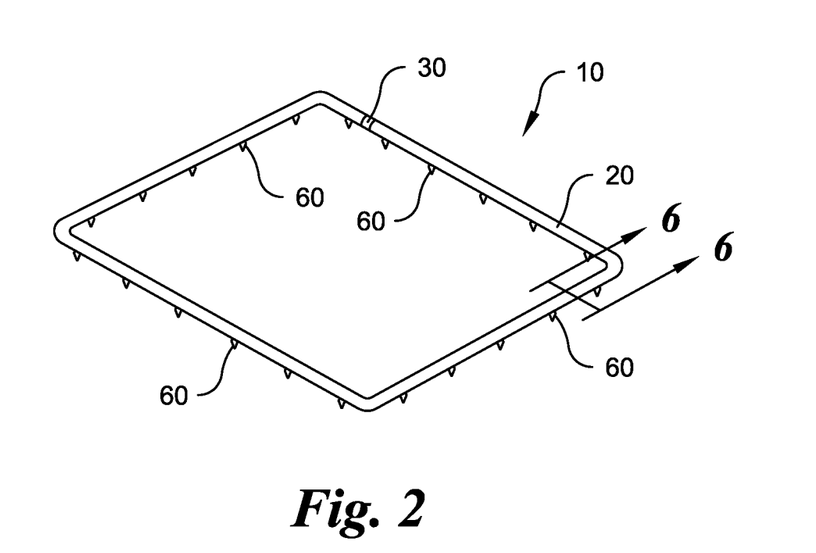
FIG. 2 is an enlarged front perspective view of the gasket of FIG. 1.

The gasket 10 has a selected configuration corresponding to the needs of the application, typically involving either surrounding an opening such as the opening 104, or being mounted to a movable object such as the oven door 110 to make contact with a strike surface such as the oven-door strike surface 102 when the oven door 110 or other movable object is closed or otherwise placed in contact with another object. Note that in this context, contact between two objects—for example, as an oven door 110 and a corresponding strike surface 102—includes configurations in which a gasket 10 mounted on one of the objects makes contact with the other object in the mounted configuration. An example of such contact may occur when the oven door 110 makes contact with the gasket 10 mounted to the oven-door strike surface 102, or when the gasket mounted 10 on the oven door 110 makes contact with the oven-door strike surface 102.

Figures 6, 7A, 7B, 7C:
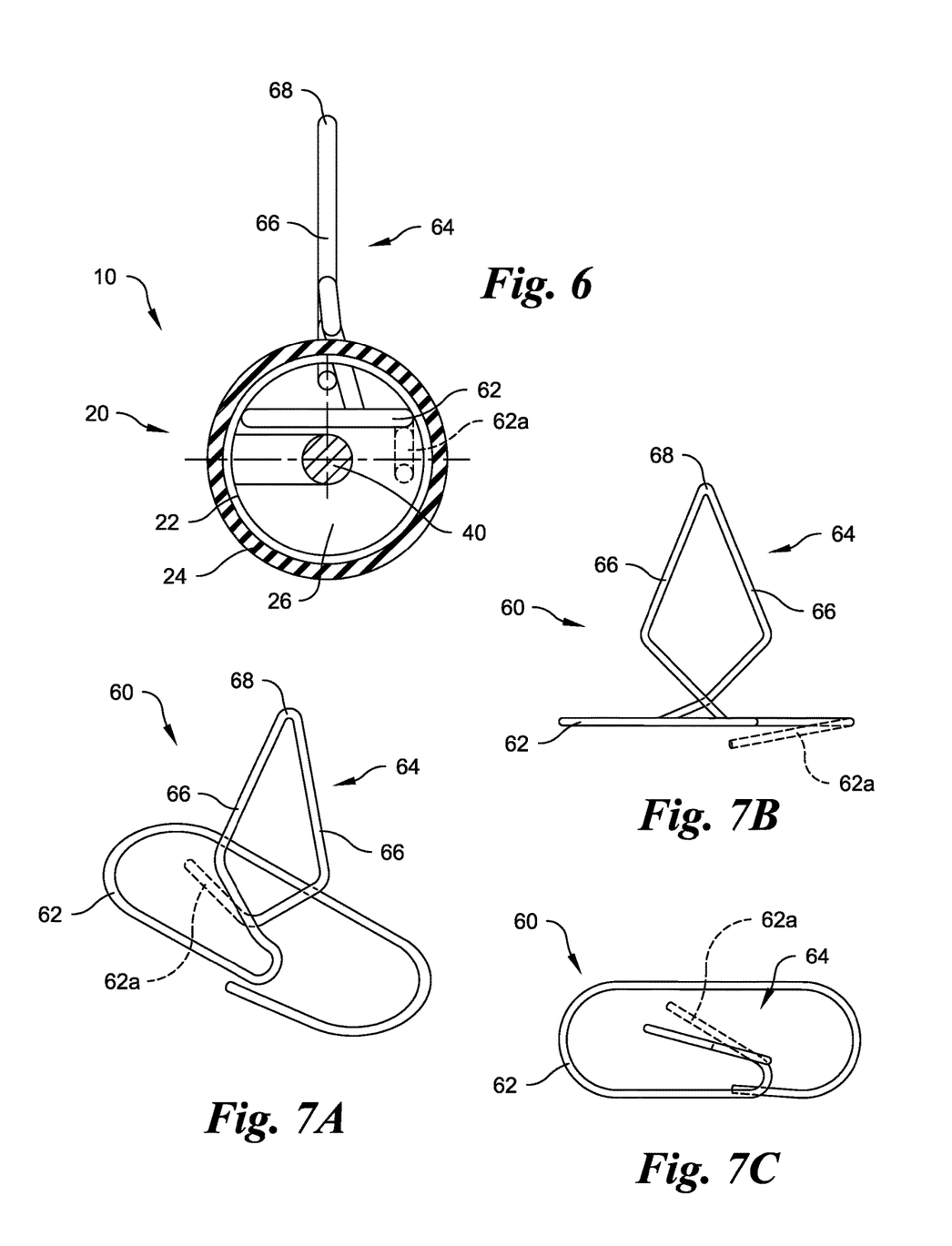
FIG. 6 an enlarged cross-sectional view of the gasket of FIG. 2, taken along the line 6-6 of FIG. 2.
FIG. 7A is a side perspective view of a gasket clip used in the gasket of FIG. 1.
FIG. 7B is front elevational view of the gasket clip of FIG. 7A.
FIG. 7C is top plan view of the gasket clip of FIG. 7A.

The gasket 10 includes a gasket body 20, which may be elongated and tubular and may preferably be essentially round in cross-section. The gasket body 20 may alternatively have other cross-sectional shapes, such as an oval, a tadpole shape, square, rectangular or another suitable shape. The gasket body 20 may be formed as a tubular member, and the ends of the tubular member may be coupled together at a joint 30 so that the elongated tubular member may form a closed loop using standard techniques, such as by forming male and female ends of the gasket body 20, engaging the male and female ends, and then securing the male and female ends to one another by sewing, stapling, or another suitable method. Alternatively, the ends of the tubular member may not be joined and may be overlapped or may simply abut, or a gap may be disposed between such ends. Referring to FIG. 6, the gasket body 20 may be formed with a gasket core 22 and a jacket 24. The gasket core 22 may preferably be an elongated, flexible, tubular member with a closed-loop, typically circular, transverse cross-sectional shape, and may preferably be knitted from a one or a plurality of stainless steel or other spring tension wires in a conventional fashion; alternatively, another suitably stiff, elastic, and heat-resistant material may be used, either alone or in combination with stainless steel or other suitable materials. The jacket 24 also may preferably be an elongated, flexible tubular member of typically circular cross-sectional shape, although not so limited, as described above, that preferably closely surrounds and extends along the gasket core 22. Preferably the jacket 24 is interwoven, preferably braided, from a multiplicity of glass fibers or glass fiber yarns; however, the jacket 24 may be formed from other heat-resistant yarns or other suitable materials. The gasket core 22 may preferably aid in preventing the jacket 24 from collapsing under a compressive load. Optionally, joined male and female ends of the gasket body 20 may be wrapped with cloth such as fiberglass or other heat-resistant cloth and/or covered with a tubular joint cover formed from materials such as those disclosed above as being suitable for the jacket 24.

The gasket core 22 and the jacket 24 may enclose a body interior 26. Disposed within the body interior 26 may be an elongated frame, which may be formed of an elongated metal member such as a wire or a rod 40 (as shown) or alternatively may be formed of another suitably stiff and temperature-resistant material. The rod 40 or other frame may be rigid or may be bendable and in particularly may be able to be plastically deformed into a selected shape that is retained after removal of the bending load. The rod 40 is shown with a solid, round cross-section, but the cross-section of the rod 40 may alternatively be an oval, an octagon, square, rectangle or another suitable cross-sectional shape (or truncated portion thereof) and may include a tubular member with any of the previously noted cross-sectional shapes, or truncated portions thereof. The rod 40 or other frame has a length and may be at least partially unattached with respect to the gasket body 20, allowing a portion or all of the rod 40 or other frame to move relative thereto freely (limited by the dimensions of the body interior 26) within the body interior 26, or may be secured to the gasket body 20 along part or all of the length of the rod 40 or other frame. (Note that in FIG. 6, the rod 40 appears in cross-section at the center of the body interior 26, and in side elevation extending to the left of FIG. 6 due to the rod 40 containing a right angle corresponding to a formed shape of the gasket 10.) As a result, the rod 40 or other frame may hold the gasket body 20 generally in the formed shape (an overall rectangular shape as shown), while allowing the gasket body 20 to be moved without substantial resistance within the limits of relative motion between the gasket body 20 and the rod 40 and/or movement limits permitted by the flexibility of the rod 40 or other frame, thus aiding the ease installation of the gasket 10.

Figure 3:
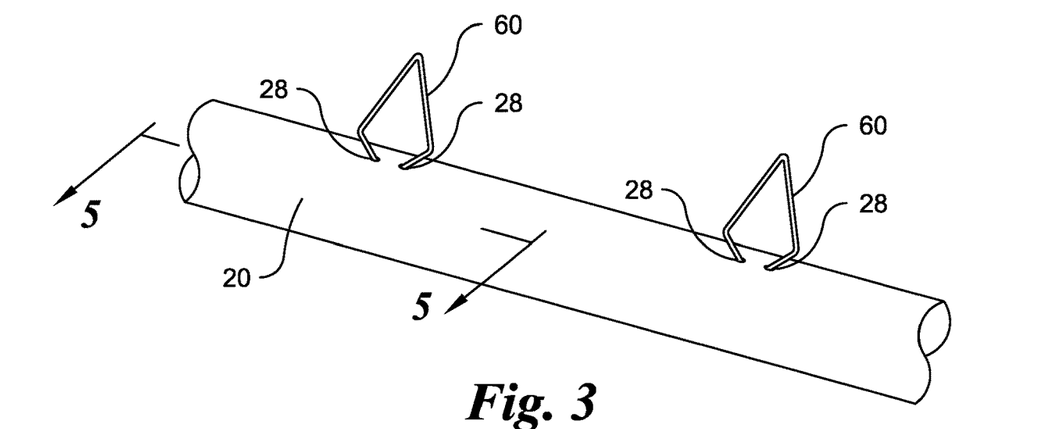
FIG. 3 is an inverted perspective detail view of a segment of the gasket of FIG. 1.
Figure 4:
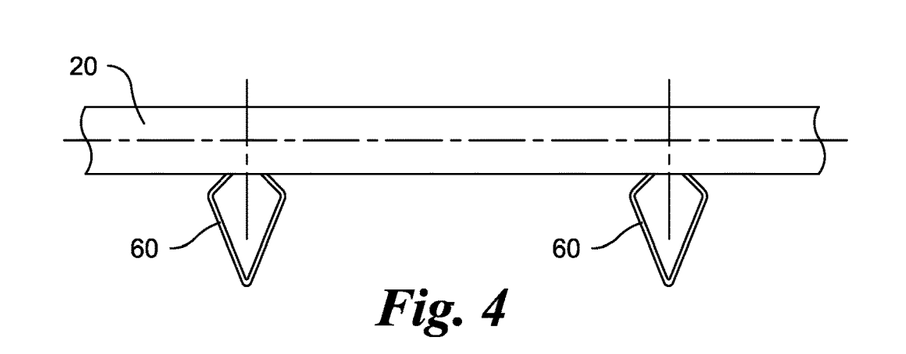
FIG. 4 is a side elevational detail view of a segment of the gasket of FIG. 1.
Figure 5:
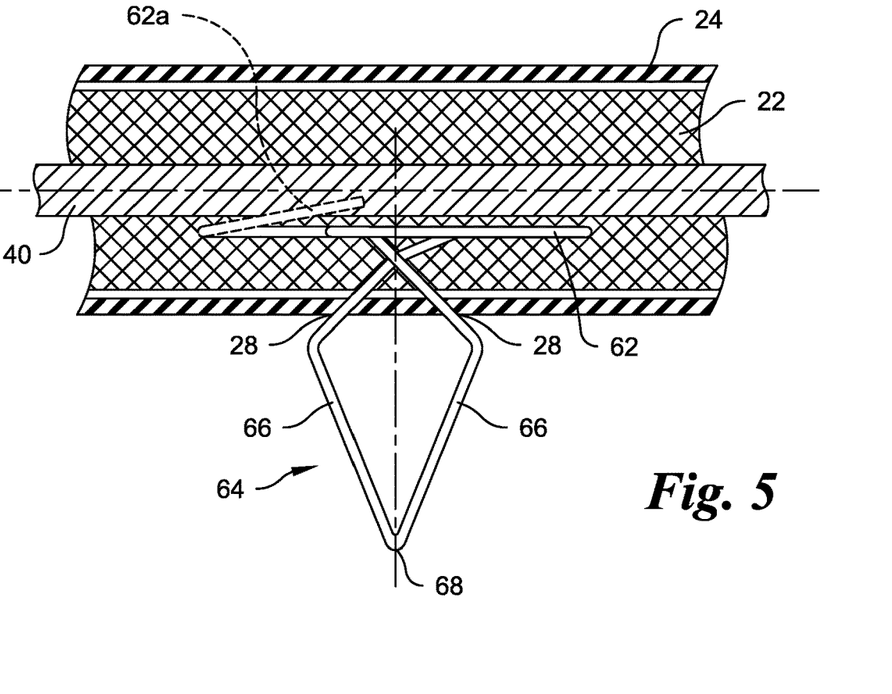
FIG. 5 is a greatly enlarged cross-sectional view of the gasket segment of FIG. 3, taken along the line 5-5 in FIG. 3.

Referring now to FIGS. 1-7C, the gasket 10 may include a plurality of fasteners, which may take the form of spring clips 60, which may be spaced along the gasket body 20 in locations aligning the spring clips 60 with the mounting holes 114 or other mounting receptacles of the interior surface 110 of the oven door 110 or the oven-door strike surface 102 attachable to the spring clips 60. The spring clips 60 may extend radially outwardly from the gasket body 20 and may be located and configured to engage the plurality of mounting receptacles (mounting holes 114) of the mounting surface in the mounting configuration. Each spring clip 60 may, in one embodiment, be formed from a wire bent to form a generally planar base 62 (which may include an optional end portion 62a, shown in phantom) and an engagement portion 64, having a pair of legs 66, extending generally transverse to the base 62 and extending radially outwardly from the gasket body 20. The base 62 may preferably be located within the body interior 26, and the engagement portion 64 may preferably extend outwardly through the gasket body 20, preferably by being woven into the gasket core 22 and the jacket 24, so that the legs 66 pass through openings 28 passing through gasket core 22 and the jacket 24, as shown in FIGS. 3 and 5. The openings 28 may be closely fitted to the legs 66 where the jacket 24 is formed about the legs 66, with the clip 60 in place. The material of the jacket 24 may be in contact with or closely fitted to the legs 66, with the material of the jacket 24 leaving little or no free space around each leg 66. Alternatively, the base 62 may be of a different shape from that shown. The engagement portion 64 may be configured to engage a mounting receptacle such as the mounting hole 114 in the mounted configuration. The angled legs 66 of the engagement portion 64 are preferably elastically movable or deformable and may be mutually joined at a vertex 68. The engagement portion 64 may have a maximum width greater than the diameter of a corresponding mounting hole 114. The legs 66 may elastically move toward one another and/or elastically deform the engagement portion 64 as the engagement portion 64 is advanced into the mounting hole 114 or other mounting receptacle; and the legs 66 may elastically return to a resting position after the engagement portion 64 has advanced into the mounting hole 114 or other mounting receptacle, and thus may resist removal of the spring clip 40 from the mounting hole 114 or other mounting receptacle. Optionally the clip 60 may be formed such that the mounting process may not be reversed by withdrawing the gasket 10 (and as a result, the engagement portion 64) from the mounting hole 114 or the mounting receptacle without damaging the gasket 10. Thus, the engagement portions 64 and the mounting holes 114 or other mounting receptacles may cooperate to secure the gasket 10 non-removably or removably to the interior surface 112 of the oven door 110, or to the oven-door strike surface 102 in the alternative installation mentioned above. That is, in some embodiments, a spring clip 60 of the plurality of spring clips 60 may be configured so that when the spring clip 60 is engaged with a mounting receptacle (such as mounting hole 114) of the plurality of mounting receptacles, the spring clip 60 is locked in the receptacle, so that the gasket 10 is not removable from the mounting base. In such embodiments, an attempt to detach the gasket by movement of the gasket 10 away from the mounting base results in the spring clip 60 being at least partially removed from the gasket body 20. Other particular configurations of spring clips or mounting clips may be suitable for mounting with a base in the body interior 26 of the gasket 10 and an engagement portion extending to the exterior of the gasket body 20 of the gasket 10, in addition to the specifically disclosed and described spring clip 60.

Figure 8:
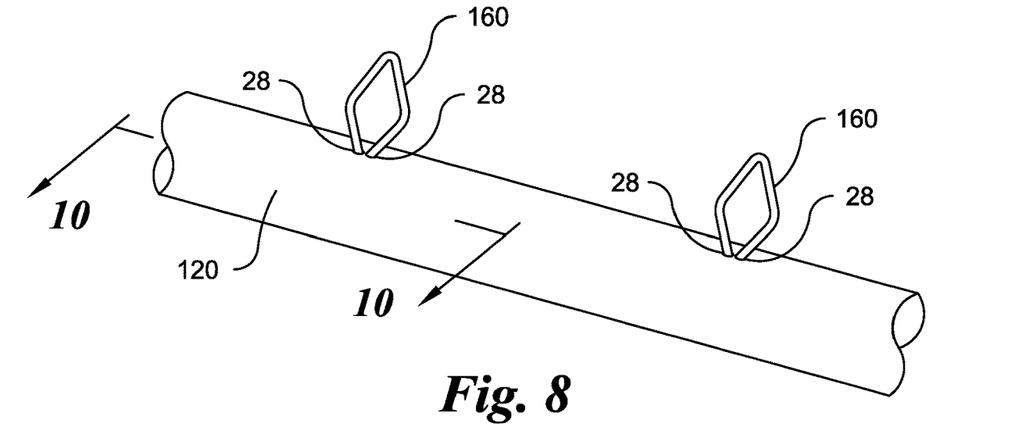
FIG. 8 is an inverted perspective detail view of a segment of a gasket according to a second preferred embodiment of the present disclosure.
Figure 9:
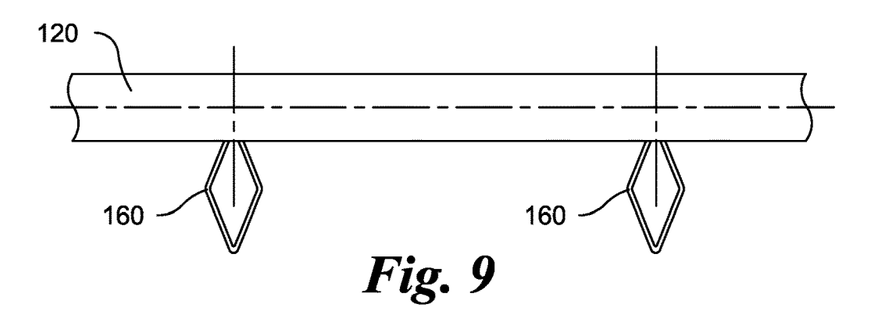
FIG. 9 is a side elevational detail view of the segment of the gasket of FIG. 8.
Figure 10:
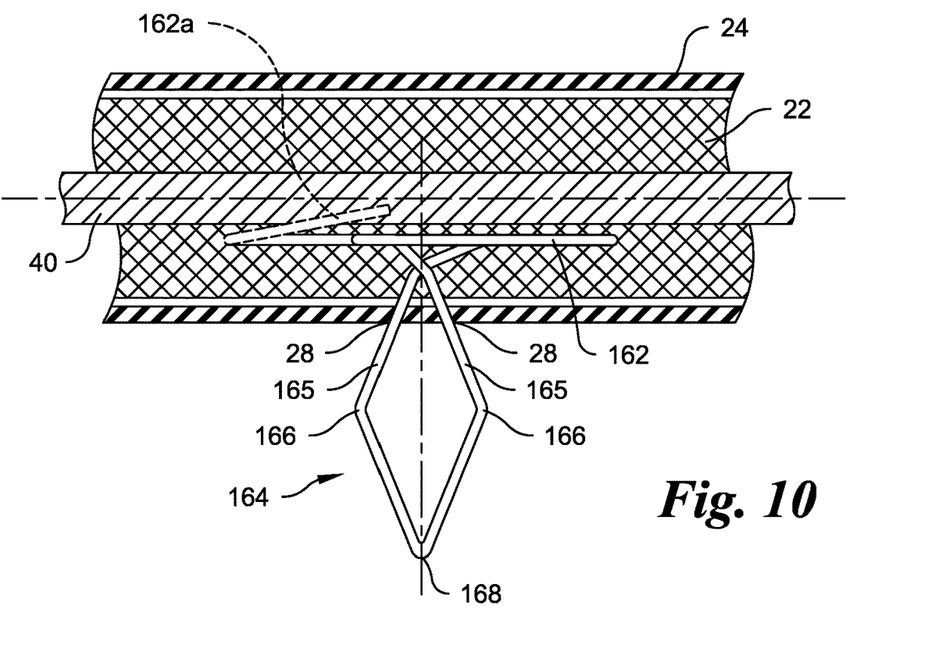
FIG. 10 is an enlarged cross-sectional view of the gasket of FIG. 8, taken along the line 10-10 in FIG. 8.

Referring to FIGS. 8-10, in an alternative embodiment, a gasket body 120 has spring clips 160, which differ in shape from the spring clips 60 previously disclosed, while being in many aspects similar in operation to the spring clips 60. The spring clips 160 have a base 162 (having an optional end portion 162a, shown in phantom) and an engagement portion 164 extending generally transverse to the base 162. The base 162 may preferably be located within the body interior 26, and the engagement portion 164 may preferably extend outwardly through the gasket body 20, preferably by being woven into the gasket core 22 and the jacket 24, so that a pair of legs 165 pass through openings 28 passing through the jacket 24, as shown in FIGS. 8 and 10. The openings 28 may be closely fitted to the legs 165 where the jacket 24 is formed about the legs 165, with the spring clip 160 in place. The material of the jacket 24 may be in contact with or closely fitted to the legs 66, with the material of the jacket 24 leaving little or no free space around each leg 66. Optionally the base 162 may be of a different shape from that shown. The engagement portion 164 may be configured to engage a mounting receptacle such as the mounting hole 114 in the mounted configuration. The pair of legs 165 are preferably elastically movable or deformable and may be mutually joined at a vertex 168. In the embodiment shown, each leg 165 has an angled portion 166, so that the engagement portion 164 forms a diamond or parallelogram shape. The engagement portion 164 may have a maximum width greater than the diameter of a corresponding mounting hole 114. The legs 165 may elastically move toward one another and/or elastically deform the engagement portion 164 as the engagement portion 164 is advanced into the mounting hole 114 or other mounting receptacle; and the legs 165 may elastically return to a resting position after the engagement portion 164 has advanced into the mounting hole 114 or other mounting receptacle. The gasket body 120 is otherwise substantially identical to previously disclosed gasket body 20 and may be used in forming a gasket in the same manner disclosed above with respect to the gasket 10 incorporating the previously disclosed gasket body 20.

Among potential advantages of the gasket 10 disclosed herein (regardless of the type of spring clips 60, 160 included therein), the rod 40 or other frame may be configured to cause the gasket 10 to assume an initial shape congruent with or compatible with the alignment of the mounting holes 114 or other receptacles used for mounting the gasket 10. Thus the shape of the rod 40 may be configured to align the gasket body 20 with the mounting configuration, and to align the plurality of spring clips 60 with the plurality of mounting holds 114 in the mounting configuration. The gasket 10 may preferably provide some flexibility with respect to the initial shape as a result of the rod 40 or other frame moving freely within the body interior 26, preventing user difficulty in conforming the gasket 10 to the alignment of the mounting holes 114 or other receptacles, which typically are pre-formed in the interior surface 112 of the oven door 110 or in the oven-door strike surface 102. Moreover, spring clips 60, 160 may preferably be placed in the gasket body 20 at locations aligning the spring clips 60, 160 with the corresponding mounting holes 114 of a particular interior surface of the oven door 110 or the oven-door strike surface 102. A typical gasket may require an installer to install spring clips or other mounting devices into a gasket by hand, and to form the gasket into a shape necessary to align with the mounting receptacles or holes 114 and aligning the spring clips or other mounting devices with the available mounting receptacles or holes 114 by hand. In contrast, the gasket 10 according to the present disclosure, by virtue of the rod 40 or other frame and the spring clip 60, 160 placed in the gasket body 20, may provide alignment of the spring clips 60, 160 with the mounting holes 114 or other mounting receptacles 114 of the interior surface 112 of the oven door 110 or the oven-door strike surface 102, with the flexibility and ease of installation described above.

A method is disclosed for attaching the gasket 10 to a mounting base having a plurality of mounting receptacles 114 disposed to secure the gasket 10 in a mounting configuration. The method may comprise aligning the gasket 10 with the selected configuration. The gasket 10 preferably comprises the elongated gasket body 20 comprising the elongated gasket core 22 and the jacket 24 disposed radially outwardly from and surrounding the gasket core 22, the gasket core 22 and the jacket 24 surrounding a body interior 26. The rod 40 or other frame is disposed for movement within the body interior 26, wherein the rod 40 or other frame has a length and is either unattached to the gasket body 20 or attached to the gasket body 20 along all or a portion of the length of the rod 40 or other frame. The plurality of spring clips 60, 160 are configured to engage the gasket 10 and a plurality of mounting receptacles 114 of the mounting surface 112, wherein each spring clip 60, 160 has the base 62, 162 that is disposed within the body interior 26 and the engagement portion 64 extending radially outwardly from the gasket body 20 through an opening. The frame, such as the rod 40, and the gasket body 20 are configured, and the rod 40 may have an initial shape, configured to align the gasket 10 with the selected configuration of the gasket 10, and to align the plurality of spring clips 60, 160 with the plurality of mounting receptacles 114. The method further comprises engaging the plurality of spring clips 60, 160 with the plurality of mounting receptacles 114 to secure the gasket 10 to the surface 112, preferably the oven door 110, in the mounted configuration.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure as defined by the appended claims.

The invention claimed is:

1. A gasket for attachment to a mounting base comprising either an oven door or an oven-door strike surface for abutting a closed oven door, the mounting base having a plurality of mounting receptacles disposed to secure the gasket to the mounting surface in a mounting configuration, the gasket comprising:
   a gasket body, the gasket body being tubular and elongated and having a gasket core and a jacket disposed radially outwardly from and surrounding the gasket core, with the gasket core being elongated and surrounding a hollow body interior, the hollow body interior being elongated;
   a frame disposed within the hollow body interior and extending along the hollow body interior, the frame defining a shape alignable with the mounting configuration, with the frame being elongated and spaced from the gasket core to be radially movable within the hollow body interior to allow limited radial movement of the gasket body with respect to the shape by allowing radial movement of the frame within the hollow body interior, and
   a plurality of spring clips attached to the gasket body, the plurality of spring clips extending radially outwardly from the gasket body and located and configured to engage the plurality of mounting receptacles of the mounting surface in the mounting configuration.

2. The gasket according to claim 1, wherein the shape of the frame is configured to align the gasket body with the mounting configuration, and to align the plurality of spring clips with the plurality of mounting receptacles in the mounting configuration, and
   wherein the frame is not attached to the spring clips, so that the frame is radially movable within the hollow body interior without moving the spring clips with respect to the gasket body.

3. The gasket according to claim 1, wherein a spring clip of the plurality of spring clips has a base secured to the gasket body and an engagement portion extending radially outwardly from the gasket body, and
   wherein the frame and the gasket body are configured to position the plurality of spring clips to engage the plurality of mounting receptacles in the mounted configuration.

4. The gasket according to claim 2, wherein a spring clip of the plurality of spring clips has a base secured to the gasket body and an engagement portion extending radially outwardly from the gasket body, and
   wherein the frame and the gasket body are configured to position the plurality of spring clips to engage the plurality of mounting receptacles in the mounted configuration.

5. The gasket according to claim 1, wherein the frame is unattached with respect to the gasket body for radial movement relative thereto.

6. The gasket according to claim 2, wherein the frame is at least unattached with respect to the gasket body for radial movement relative thereto.

7. The gasket according to claim 3, wherein the frame is at least unattached with respect to the gasket body for radial movement relative thereto.

8. The gasket according to claim 4, wherein the frame is at least unattached with respect to the gasket body for radial movement relative thereto.

9. The gasket according to claim 1, wherein a spring clip of the plurality of spring clips is configured so that when the spring clip is engaged with a mounting receptacle of the plurality of mounting receptacles, movement of the gasket away from the mounting base results in the spring clip being at least partially removed from the gasket body.

10. The gasket according to claim 1, wherein a spring clip of the plurality of spring clips is formed so that when the spring clip is engaged with a mounting receptacle of the plurality of mounting receptacles, movement of the gasket away from the mounting base results in the spring clip being at least partially removed from the gasket body, and wherein the spring clip has a base located within the body interior, and an engagement portion extending through the gasket core and the jacket of the gasket body.

11. The gasket according to claim 10, wherein the engagement portion comprises two legs passing through openings in the jacket of the gasket body.

12. The gasket according to claim 11, wherein the legs are elastically movable and/or elastically deformable as the engagement portion is advanced into the mounting receptacle; and wherein the legs are configured to elastically return to a resting position after the engagement portion has advanced into the mounting receptacle to resist removal of the spring clip from the mounting receptacle.

13. The gasket according to claim 1, wherein the gasket body has a joint securing the gasket body into a closed loop.

14. A method for attaching a gasket to a mounting base comprising either an oven door or an oven-door strike surface for abutting a closed oven door, the mounting base having a plurality of mounting receptacles disposed to secure the gasket to the mounting surface in a mounting configuration, comprising:
  aligning the gasket with the mounting configuration, the gasket comprising:
    a gasket body, the gasket body being tubular and elongated and having a gasket core and a jacket disposed radially outwardly from and surrounding the gasket core, with the gasket core being elongated and surrounding a hollow body interior, the hollow body interior being elongated;
    a frame disposed within the hollow body interior and extending along the hollow body interior, the frame defining a shape alignable with the mounting configuration, with the frame being elongated and spaced from the gasket core to be radially movable within the hollow body interior to allow limited radial movement of the gasket body with respect to the shape by allowing radial movement of the frame within the hollow body interior, and
    a plurality of spring clips attached to the gasket body, the plurality of spring clips extending radially outwardly from the gasket body and located and configured to engage the plurality of mounting receptacles of the mounting surface in the mounting configuration; and
  engaging the plurality of spring clips with the plurality of mounting receptacles in the mounting configuration wherein engaging the plurality of spring clips with the plurality of mounting receptacles comprises moving the gasket body relative to the frame to position at least one spring clip of the plurality of spring clips for engagement with at least one mounting receptacle of the plurality of mounting receptacles.

15. The method according to claim 14, further comprising deforming the frame into the mounting configuration prior to moving the gasket body relative to the frame.

16. The method according to claim 14, wherein the shape of the frame is configured to align the gasket body with the mounting configuration, and to align the plurality of spring clips with the plurality of mounting receptacles in the mounting configuration, and
  wherein the frame is not attached to the spring clips, so that the frame is radially movable within the hollow body interior without moving the spring clips with respect to the gasket body.

17. The method according to claim 14, wherein the frame is at least partially unattached with respect to the gasket body for movement relative thereto.

18. The method according to claim 15, wherein the frame is at least partially unattached with respect to the gasket body for movement relative thereto.

19. The method according to claim 14, wherein at a time of the engaging the plurality of spring clips with the plurality of mounting receptacles, a spring clip of the plurality of spring clips and the gasket body are attached so that when the spring clip is engaged with a mounting receptacle of the plurality of mounting receptacles, movement of the gasket away from the mounting base results in the spring clip being at least partially removed from the gasket body.

20. The method according to claim 19, wherein a spring clip of the plurality of spring clips has an engagement portion, and the engagement portion comprises two legs;
  wherein the two legs are elastically movable and/or elastically deformable as the engagement portion is advanced into the mounting receptacle; and
  wherein the two legs are configured to elastically return to a resting position after the engagement portion has advanced into the mounting receptacle to resist removal of the spring clip from the mounting receptable.

* * * * *